United States Patent
Wang et al.

(10) Patent No.: US 9,837,914 B1
(45) Date of Patent: Dec. 5, 2017

(54) METHODS FOR MEETING HOLDUP TIME REQUIREMENT WITH MINIMAL BULK CAPACITANCE

(71) Applicant: INNO-TECH CO., LTD., Taipei (TW)

(72) Inventors: Chih-Liang Wang, Taipei (TW); Ching-Sheng Yu, Taipei (TW); Wen-Yen Pen, Taipei (TW)

(73) Assignee: INNO-TECH CO., LTD., Taipei (TW)

( * ) Notice: Subject to any disclaimer, the term of this patent is extended or adjusted under 35 U.S.C. 154(b) by 0 days.

(21) Appl. No.: 15/487,468

(22) Filed: Apr. 14, 2017

(51) Int. Cl.
*H02M 3/335* (2006.01)
*H02H 7/125* (2006.01)

(52) U.S. Cl.
CPC ........ *H02M 3/33507* (2013.01); *H02H 7/125* (2013.01)

(58) Field of Classification Search
CPC .......................... H02M 3/33507; H02H 7/125
See application file for complete search history.

(56) References Cited

U.S. PATENT DOCUMENTS

| | | | | |
|---|---|---|---|---|
| 6,262,565 B1* | 7/2001 | Williams | ............... | H02M 5/257 323/237 |
| 2004/0136208 A1* | 7/2004 | Agarwal | ............. | H02M 1/4208 363/21.12 |
| 2011/0075447 A1* | 3/2011 | Clemo | .................... | H02M 1/15 363/20 |
| 2012/0106206 A1* | 5/2012 | Tang | ................... | H02M 1/4258 363/21.02 |

* cited by examiner

*Primary Examiner* — Jue Zhang
(74) *Attorney, Agent, or Firm* — Lin & Associates Intellectual Property, Inc.

(57) ABSTRACT

Disclosed is a method of dynamical adjustment for a power supply. The method takes aim at lowering the minimum bulk capacitor voltage to the maximum extent through increasing the switching frequency or the OCP (Over-Current Protection) trip point during the holdup time so that the holdup time can get prolonged or the bulk capacitor can get downsized provided that all other parameters remain unchanged. In general, the proposed method is applicable to a wide variety of power converters.

6 Claims, 10 Drawing Sheets

METHODS FOR MEETING HOLDUP TIME REQUIREMENT WITH MINIMAL BULK CAPACITANCE

BACKGROUND OF THE INVENTION

1. Field of the Invention

The present invention relates to two cost-effective methods either for prolonging the holdup time without the necessity for upsizing the bulk capacitor or for downsizing the bulk capacitor without the penalty of shortening the holdup time so that the performance-to-cost ratio can be brought up to a higher level.

2. The Prior Arts

The majority of today's computer and computer peripherals require that their power supplies be capable of lasting a holdup time of at least 10 ms to orderly terminate the operation of data-processing equipment or switch over to the UPS (Uninterrupted Power Supply) operation after a short-/long-term outage of electric power. The holdup time is generally defined as the time interval during which a power supply needs to hold up its output voltage(s) within a specified range after a power outage.

The energy required for holding up the output voltage(s) during the holdup time is solely provided by a properly sized bulk capacitor $C_B$, as is shown in FIG. 1a. The front-end rectifier is in charge of rectifying a sinusoidal AC input into an unregulated DC input via a bridge rectifier or a regulated DC input via a conventional/bridgeless power factor corrector (PFC). To achieve a desired holdup time after the outage of AC power, the DC/DC converter output stage must be able to operate in a certain voltage range with a minimum bulk capacitor voltage $V_{BMIN}$ which is lower than a nominal bulk capacitor voltage $V_{BNOM}$ that corresponds to the line voltage at which the holdup time is specified.

Without being recharged up by the AC mains during the holdup time $T_H$, the bulk capacitor $C_B$ keeps providing power to the outputs until discharging down to the minimum bulk capacitor voltage $V_{BMIN}$ below which the DC/DC converter output stage would shut off, as is illustrated in FIG. 1b.

The holdup time $T_H$ can be mathematically expressed as $$\Delta E_{CB} = \frac{1}{2}C_B(V_{BNOM}^2 - V_{BMIN}^2) = \frac{P_{OH}T_H}{\eta_{DC/DC}} \Rightarrow T_H = \frac{\eta_{DC/DC}\Delta E_{CB}}{P_{OH}}, \quad (1)$$

where $\eta_{DC/DC}$ is the DC/DC converter efficiency and $P_{OH}$ is the output power delivered to the outputs during the holdup time $T_H$.

The energy delivery ratio r can be calculated from $$r = \frac{\Delta E_{CB}}{E_{CBNOM}} = \frac{\frac{1}{2}C_B(V_{BNOM}^2 - V_{BMIN}^2)}{\frac{1}{2}C_B V_{BNOM}^2} = 1 - \left(\frac{V_{BMIN}}{V_{BNOM}}\right)^2, \quad (2)$$

where $\Delta E_{CB}$ is the partial energy delivered to the outputs during the holdup time $T_H$ and $E_{CBNOM}$ is the total energy stored in the bulk capacitor $C_B$ at the nominal bulk capacitor voltage $V_{BNOM}$. Eq. (2) can be graphically represented in FIG. 2.

As can be seen from Eq. (1) and Eq. (2), the holdup time $T_H$ can be prolonged and the energy delivery ratio r can be enlarged or the bulk capacitor $C_B$ can be downsized by lowering the minimum bulk capacitor voltage $V_{BMIN}$ above which the DC/DC converter output stage still can work, provided that all other parameters remain unchanged.

In prior arts, the minimum bulk capacitor voltage $V_{BMIN}$ is usually restricted to 80% to 90% of the nominal bulk capacitor voltage $V_{BNOM}$ and disallowed to get lowered due to the lack of feasible and economical approaches, leaving most stored bulk capacitor energy unused and wasted after the DC/DC converter output stage shuts off below the minimum bulk capacitor voltage $V_{BMIN}$.

In view of the deficiency of prior arts, the present invention comes up with two cost-effective methods for substantially prolonging the holdup time $T_B$ and enlarging the energy delivery ratio r or downsizing the bulk capacitor $C_B$ by lowering the minimum bulk capacitor voltage $V_{BMIN}$ to the maximum extent, making the most of the stored bulk capacitor energy and maximizing the performance-to-cost ratio of power supplies.

SUMMARY OF THE INVENTION

In the present invention, two cost-effective methods that substantially improve the utilization of the stored bulk capacitor energy in a power supply during the holdup time are detailed.

The substantial improvement is achieved by lowering the minimum bulk capacitor voltage to the maximum extent through increasing the switching frequency or the OCP (Over-Current Protection) trip point during the holdup time so that the holdup time can get prolonged or the bulk capacitor can get downsized provided that all other parameters remain unchanged.

In general, the proposed methods are applicable to a wide variety of power converters. For ease of making clear the central idea behind the present invention, a flyback converter is singled out as an illustrative example in the present invention without loss of generality.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1A:
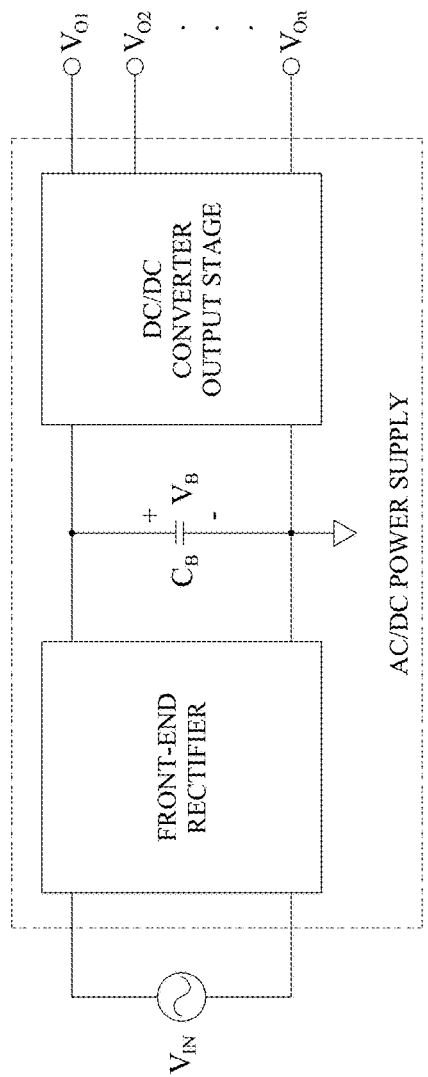
FIG. 1a shows a typical AC/DC power supply architecture, where a bulk capacitor $C_B$, placed between a front-end rectifier and a DC/DC converter output stage as an energy-storage capacitor, would be the one and only power source to hold up the outputs $V_{o1}, V_{o2}, \ldots, V_{on}$ after the outage of the AC power $V_N$.
Figure 1B:
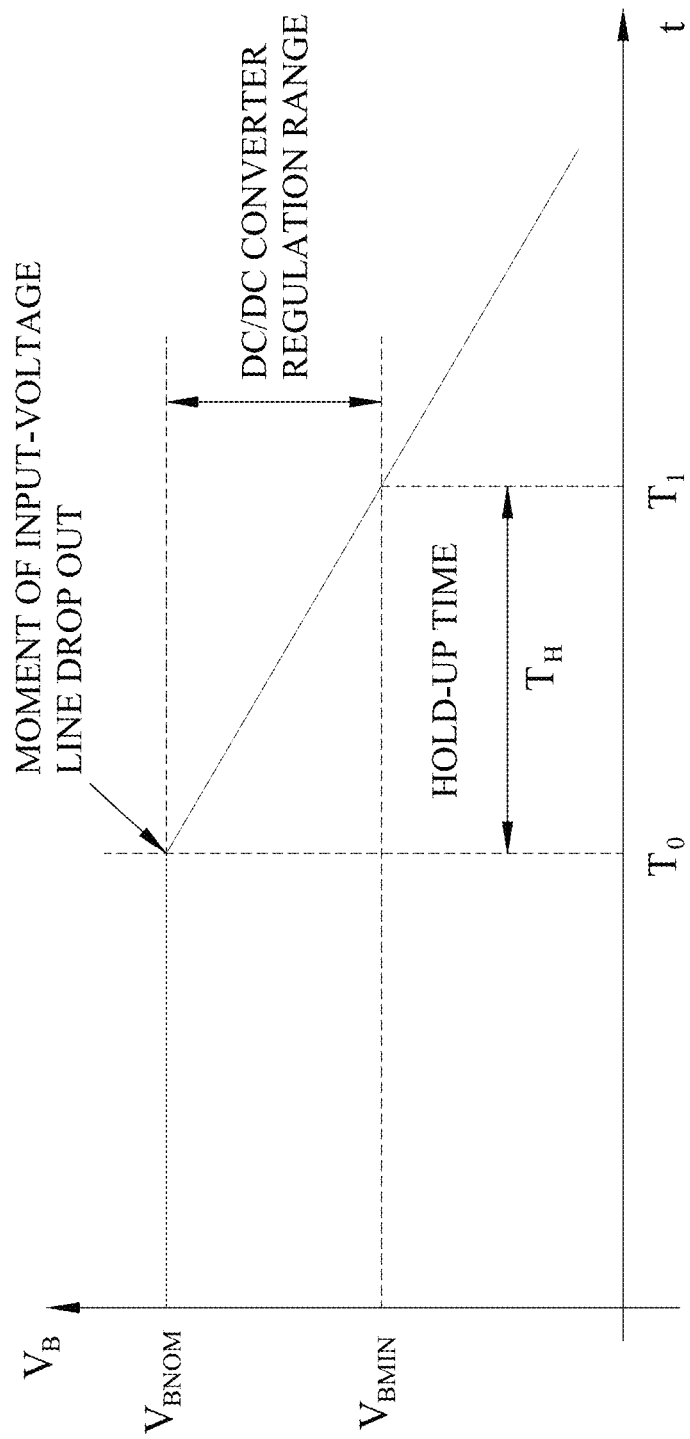
FIG. 1b defines the holdup time $T_H = T_1 - T_0$, where $T_0$ is the time instant when the bulk capacitor $C_B$ starts holding up the outputs, i.e., when the bulk capacitor voltage $V_B$ drops from its nominal voltage level $V_{BNOM}$, and $T_1$ is the time instant when the bulk capacitor $C_B$ stops holding up the outputs, i.e., when the bulk capacitor voltage $V_B$ gets to its minimal voltage level $V_{BMIN}$.
Figure 2:
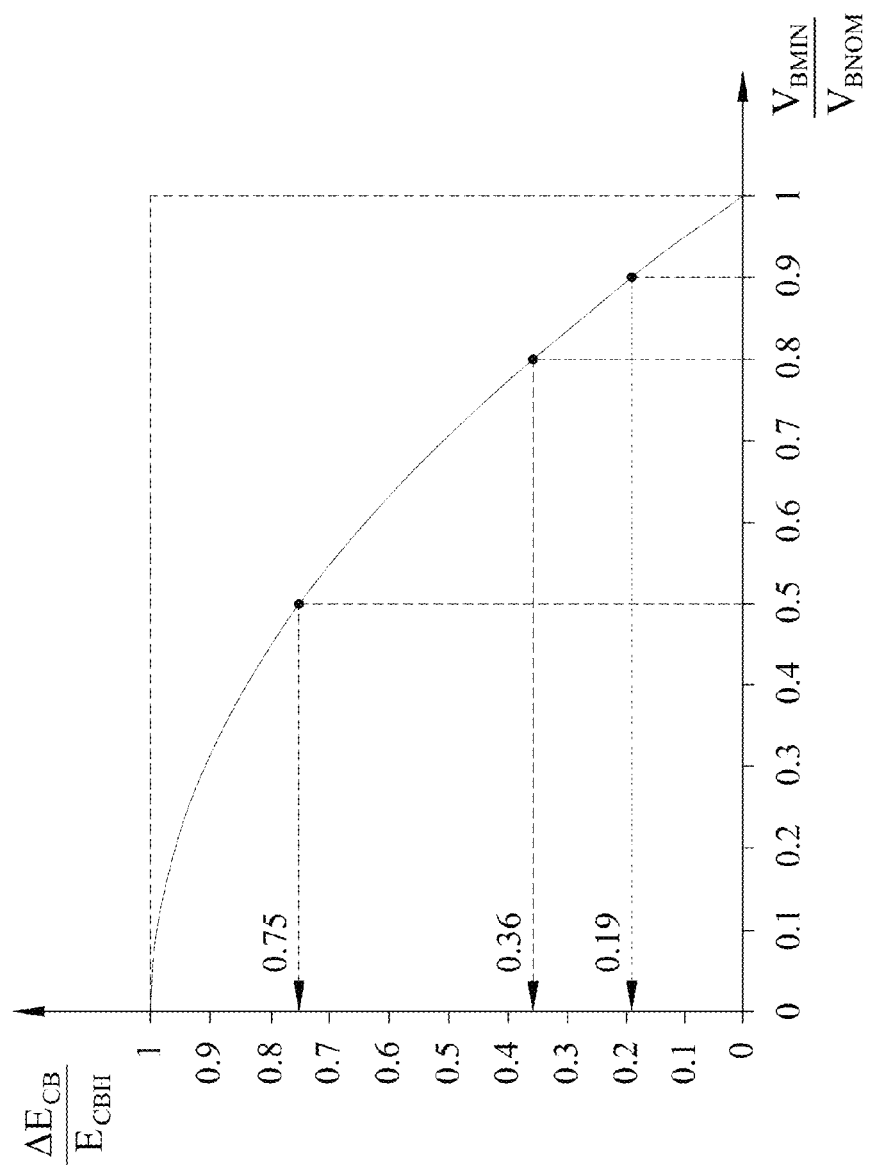
FIG. 2 gives a plot of the energy delivery ratio $r = \Delta E_{CB}/E_{CBNOM}$ as a function of the normalized minimum bulk capacitor voltage $V_{BMIN}/V_{BNOM}$.
Figure 3:
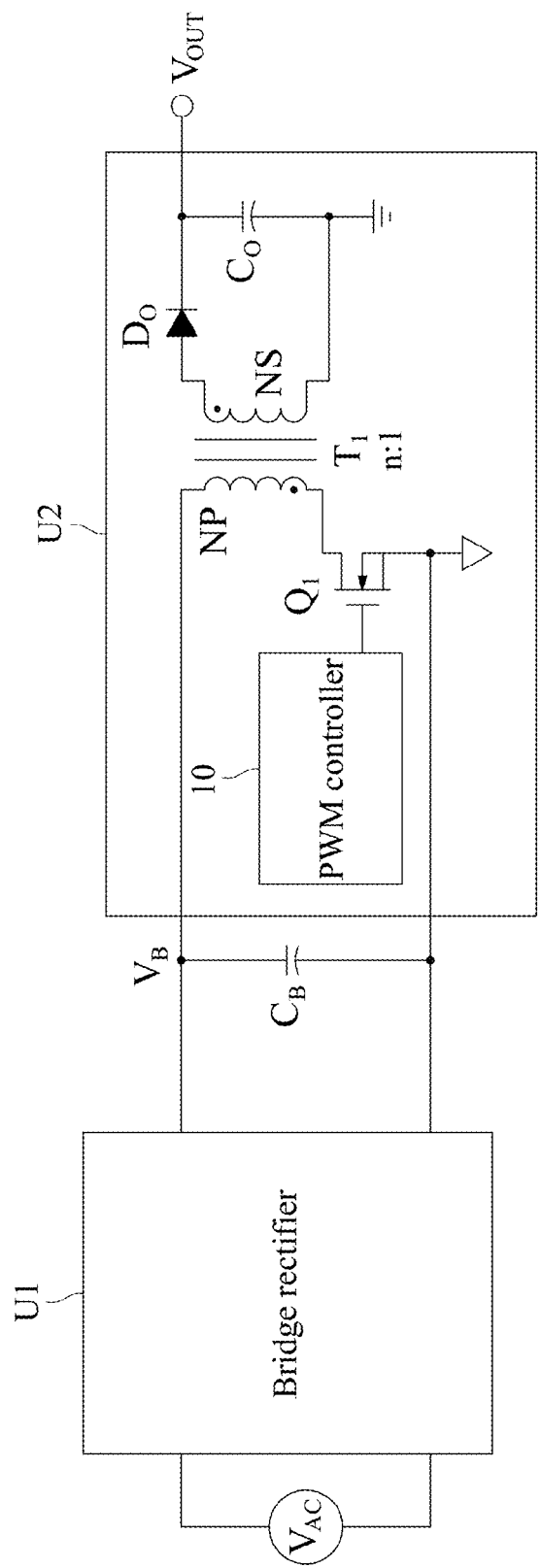
FIG. 3 shows a typical flyback converter architecture taken as an illustrative example for exemplifying/instantiating the present invention.

FIG. 3 shows a simplified flyback converter architecture, where a PWM (Pulse-Width Modulation) controller 10 takes control of a primary power switch Q1 to regulate a secondary output voltage $V_{OUT}$ through a unshown feedback control scheme, which can be but won't be limited to Primary-Side Regulation (PSR) or Secondary-Side Regulation (SSR).

In the presence of AC power before a power outage, an input capacitor $C_N$ (commonly called a bulk capacitor $C_B$ as a jargon) would be discharged down to its valley voltage when the sinusoidal AC voltage $V_{AC}$ of the AC power source is lower than the bulk capacitor voltage $V_B$, i.e., when a unshown bridge rectifier stops conducting current, and recharged up to its peak voltage when the sinusoidal AC voltage $V_{AC}$ is higher than the bulk capacitor voltage $V_B$, i.e., when a unshown bridge rectifier starts conducting current. The unshown bridge rectifier can be but won't be limited to a diode bridge rectifier or a MOSFET (Metal-Oxide-Semiconductor Field-Effect Transistor) bridge rectifier.

The ripple voltage, defined as the difference between the peak voltage and the valley voltage, is normally negligibly small compared to the average value of the bulk capacitor voltage $V_B$. So, the bulk capacitor voltage $V_B$ can be deemed almost constant when the AC mains voltage stays unchanged.

In the absence of AC power after a power outage, all the energy required for holding up the output voltage $V_{OUT}$ during the holdup time relies on the bulk capacitor $C_B$.

Figure 4:
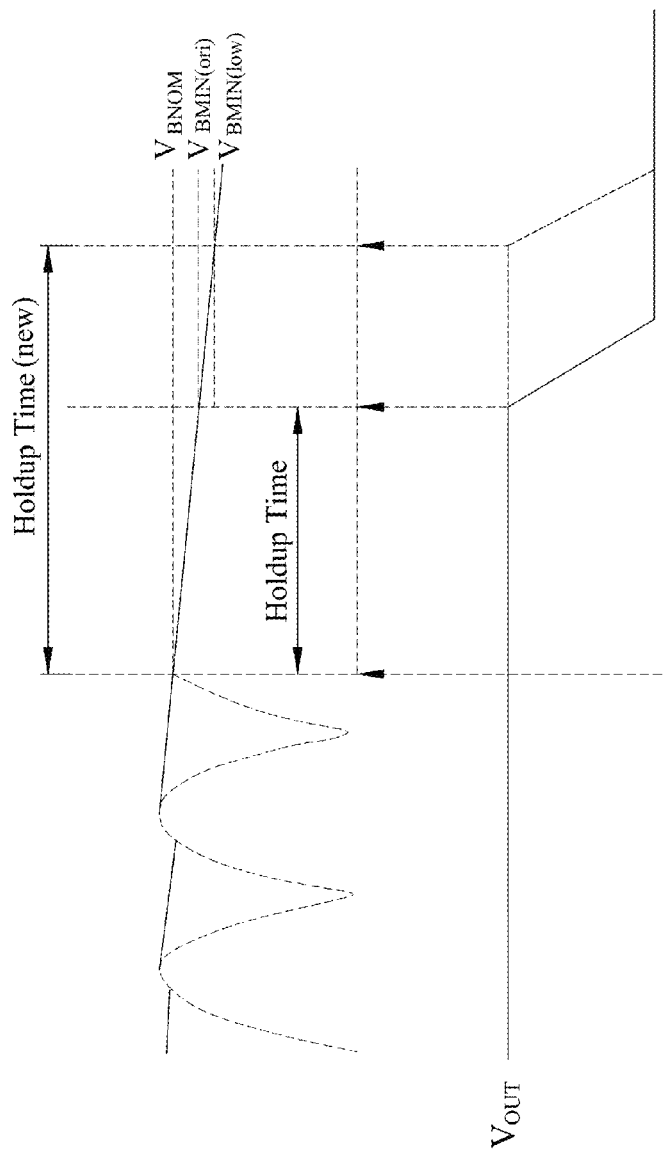
FIG. 4 contrasts the original holdup time $T_{H(ori)}$ with the prolonged holdup time $T_{H(pro)}$ by lowering the original minimum bulk capacitor voltage $V_{BMIN(ori)}$ to a lowered minimum bulk capacitor voltage $V_{BMIN(low)}$.

From Eq. (1) and FIG. 4 it can be seen that the holdup time $T_H$ will get prolonged as the minimum bulk capacitor voltage $V_{BMIN}$ gets lowered, milking as much stored energy out of the bulk capacitor $C_B$ as possible. The output voltage $V_{OUT}$ will drop out of regulation and then down to zero soon after the expiry of the holdup time $T_H$ due to OCP or DRL (Duty-Ratio Limit), whichever comes first, because the primary peak current $I_{PPK}$ will eventually go up to the OCP trip point or the duty ratio D will finally reach the DRL trip point when the bulk capacitor voltage $V_B$ drops down to the minimum bulk capacitor voltage $V_{BMIN}$. It is OCP or DRL that terminates the holdup time $T_H$.

Figure 5:
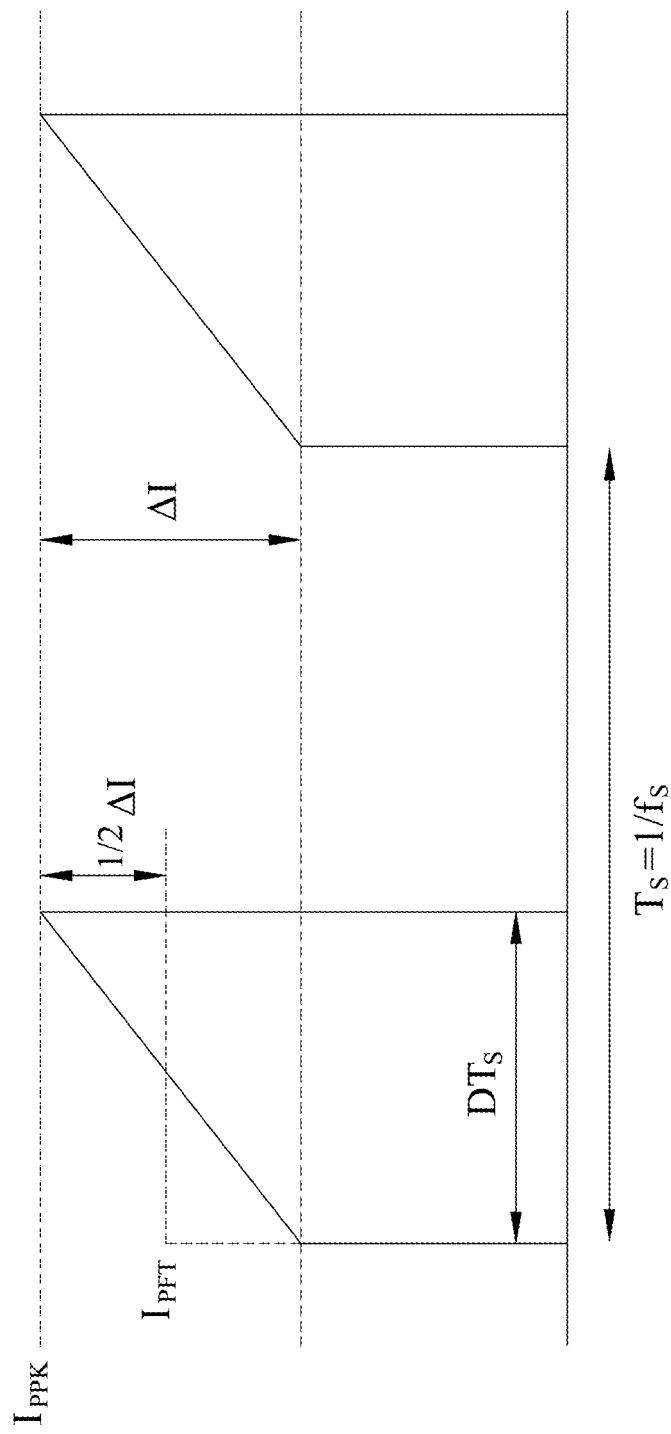
FIG. 5 shows the primary current waveform when the flyback converter operates in CCM (Continuous-Conduction Mode) during the holdup time after the outage of AC power.

FIG. 5 shows the primary current waveform when the flyback converter runs deep into CCM during the holdup time after the outage of AC power. When the bulk capacitor voltage $V_B$ drops down to the minimum bulk capacitor voltage $V_{BMIN}$, the maximum duty ratio $D_{MAX}$ can be derived from the volt-second product balance equation:

$$\begin{cases} n \triangleq \dfrac{N_P}{N_S} \\ V_{BMIN}D_{MAX} = nV_{OUT}(1 - D_{MAX}) \end{cases} \Rightarrow D_{MAX} = \dfrac{nV_{OUT}}{V_{BMIN} + nV_{OUT}}, \quad (3)$$

where n is the fixed primary-to-secondary turns ratio and $V_{OUT}$ is the regulated output voltage. The maximum duty ratio $D_{MAX}$ can thus be considered constant when the minimum bulk capacitor $V_{BMIN}$ stays constant and should be kept below an upper limit, imposing a lower limit on the minimum bulk capacitor voltage $V_{BMIN}$:

$$D_{MAX} \leq D_{LIM} \Rightarrow V_{BMIN} \geq nV_{OUT}\left(\dfrac{1}{D_{LIM}} - 1\right), \quad (4)$$

where $D_{LIM}$ is the duty ratio limit the PWM controller is disallowed to exceed.

The primary flattop current $I_{PFT}$ in FIG. 5 is so defined that the rectangle encloses the same area as does the trapezoid, facilitating the calculation of the primary average current $I_{PAV}$.

$$I_{PFT} \triangleq \dfrac{1}{D_{MAX}T_{SW}}\int_0^{D_{MAX}T_{SW}} i_P(t)\,dt \Rightarrow I_{PAV} = \\ \dfrac{1}{T_{SW}}\int_0^{T_{SW}} i_P(t)\,dt = I_{PFT}D_{MAX}, \quad (5)$$

where the primary current $i_P(t)$ is nonzero in the time interval of 0 to $D_{MAX}T_{SW}$ and zero in the time interval of $D_{MAX}T_{SW}$ to $T_{SW}$.

From Eq. (4) it follows that the average input power $P_{IN}$ at the minimum bulk capacitor voltage $V_{BMIN}$ is:

$$P_{IN}=V_{BMIN}I_{PAV}=V_{BMIN}I_{PFT}D_{MAX} \quad (6),$$

which can be further related to the average output power $P_{OH}$:

$$P_{OH}=\eta_{DC/DC}P_{IN}=\eta_{DC/DC}V_{BMIN}I_{PFT}D_{MAX} \quad (7),$$

where the DC-to-DC conversion efficiency $\eta_{DC/DC}$ during the holdup time $T_H$ for supporting the average output power $P_{OH}$ can be assumed to be almost constant for simplicity.

From Eq. (7) it can be deduced that the minimum bulk capacitor voltage $V_{BMIN}$ can be lowered by heightening the primary flattop current $I_{PFT}$, provided that all other parameters remain constant. From another point of view, the primary flattop current $I_{PFT}$ in FIG. 5 can be expressed as:

$$\begin{cases} I_{PPK} = \dfrac{V_{OCP}}{R_{CS}} \\ I_{PFT} = I_{PPK} - \dfrac{\Delta I}{2} \\ L_P\dfrac{\Delta I}{D_{MAX}T_{SW}} = V_{BMIN} \end{cases} \Rightarrow I_{PFT} = \dfrac{V_{OCP}}{R_{CS}} - \dfrac{V_{BMIN}D_{MAX}}{2L_Pf_{SW}}, \quad (8)$$

where $V_{OCP}$ is the OCP trip point, $R_{CS}$ is the current-sense resistance, $L_P$ is the primary inductance, and $f_{SW}$ is the switching frequency. In accordance with Eq. (8), there are two feasible approaches to heightening the primary flattop current $I_{PFT}$: one is to heighten the switching frequency $f_{SW}$ and the other is to heighten the OCP trip point $V_{OCP}$.

Putting train of thought in order would help one see the whole picture more clearly. Prolonging the holdup time $T_H$ boils down to heightening the switching frequency $f_{SW}$ or the OCP trip point $V_{OCP}$ in line with the central idea behind the present invention.

$$T_H \uparrow \Leftarrow V_{BMIN} \downarrow \Leftarrow I_{PFT} \uparrow \Leftarrow \begin{cases} f_{SW} \uparrow \\ V_{OCP} \uparrow \end{cases}$$

With knowledge of relevant coefficients, the minimum bulk capacitor voltage $V_{BMIN}$ can be easily solved from the following quadratic equation in one unknown:

$$\begin{cases} V_r \triangleq nV_{OUT} \\ D_{MAX} = \dfrac{V_r}{V_{BMIN} + V_r} \\ P_{OH} = \eta_{DC/DC}V_{BMIN}\left(\dfrac{V_{OCP}}{R_{CS}} - \dfrac{V_{BMIN}D_{MAX}}{2L_Pf_{SW}}\right)D_{MAX} \end{cases} \Rightarrow \quad (9)$$

$$\left(\dfrac{V_{OCP}V_r}{R_{CS}} - \dfrac{V_r^2}{2L_Pf_{SW}} - \dfrac{P_{OH}}{\eta_{DC/DC}}\right)V_{BMIN}^2 +$$

$$\left(\dfrac{V_{OCP}V_r^2}{R_{CS}} - \dfrac{2P_{OH}V_r}{\eta_{DC/DC}}\right)V_{BMIN} - \dfrac{P_{OH}V_r^2}{\eta_{DC/DC}} = 0$$

$$\begin{cases} a \triangleq \dfrac{V_{OCP}V_r}{R_{CS}} - \dfrac{V_r^2}{2L_Pf_{SW}} - \dfrac{P_{OH}}{\eta_{DC/DC}} \\ b \triangleq \dfrac{V_{OCP}V_r^2}{R_{CS}} - \dfrac{2P_{OH}V_r}{\eta_{DC/DC}} \\ c \triangleq -\dfrac{P_{OH}V_r^2}{\eta_{DC/DC}} \end{cases} \Rightarrow aV_{BMIN}^2 + bV_{BMIN} + c =$$

$$0 \Rightarrow V_{BMIN} = \dfrac{-b \pm \sqrt{b^2 - 4ac}}{2a},$$

where the unknown minimum bulk capacitor voltage $V_{BMIN}$ mathematically has two distinct real roots as long as the quadratic coefficient a is positive and hence the discriminant $b^2-4ac$ is positive, imposing a lower limit on the OCP trip point $V_{OCP}$:

$$a = \dfrac{V_{OCP}V_r}{R_{CS}} - \dfrac{V_r^2}{2L_Pf_{SW}} - \dfrac{P_{OH}}{\eta_{DC/DC}} > 0 \Rightarrow \quad (10)$$

$$\begin{cases} b^2 - 4ac > 0 \\ V_{OCP} > \dfrac{R_{CS}}{V_r}\left(\dfrac{V_r^2}{2L_Pf_{SW}} + \dfrac{P_{OH}}{\eta_{DC/DC}}\right), \end{cases}$$

where a positive quadratic coefficient a>0 implies a positive discriminant $b^2-4ac>0$ because the constant coefficient c is negative. In further consideration of the acceptability/applicability of the two distinct real roots, the positive root is physically meaningful while the negative root is physically meaningless simply because the minimum bulk capacitor voltage $V_{BMIN}$ is physically nonnegative. The physically meaningful result from Eq. (9) can then be put into Eq. (1) for the calculation of the holdup time $T_H$.

Figure 6:
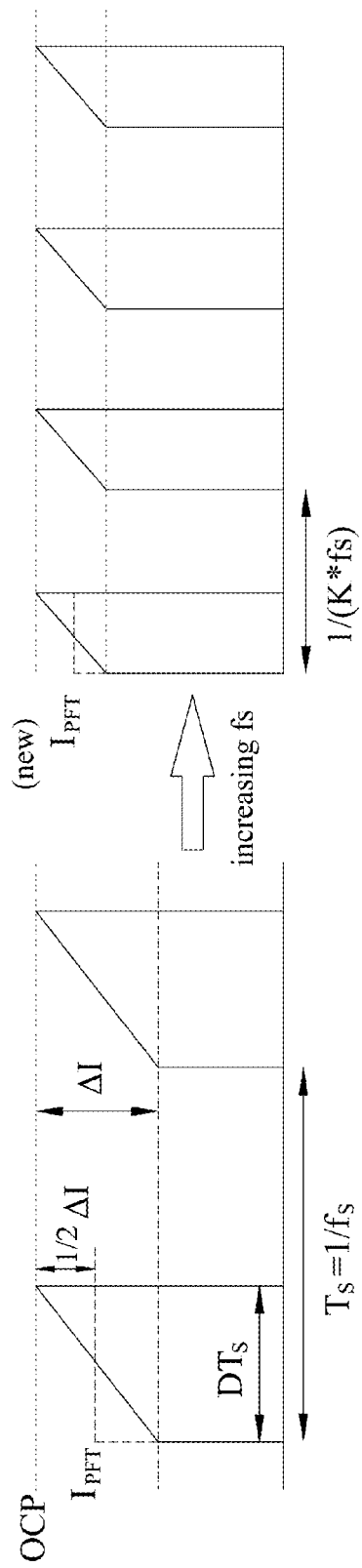
FIG. 6 shows the effect of increasing the switching frequency on the primary current waveform during the holdup time.
Figure 7:
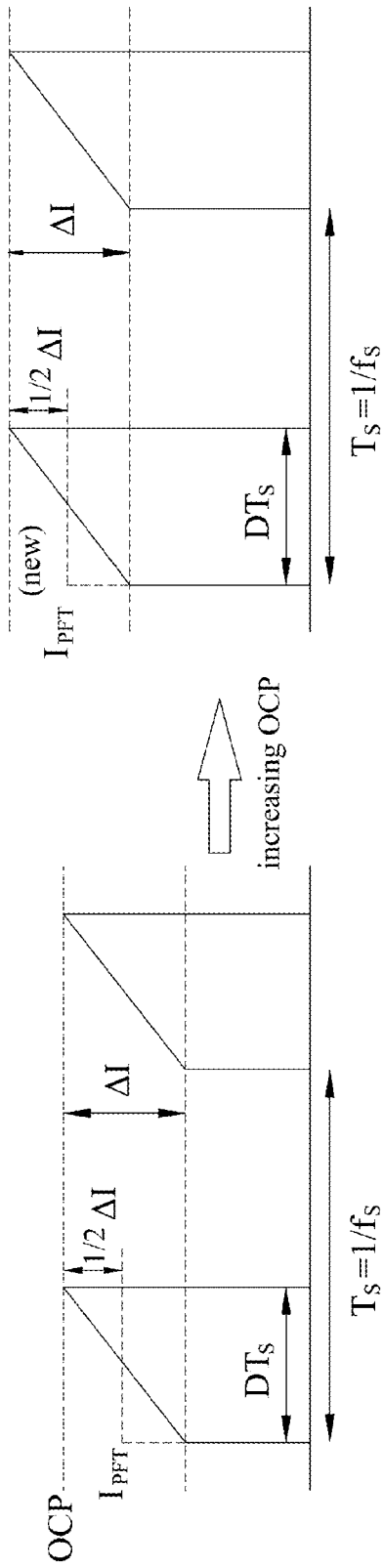
FIG. 7 shows the effect of increasing the OCP trip point on the primary current waveform during the holdup time.

As is illustrated with FIG. 6 and FIG. 7, the primary flattop current $I_{PFT}$ can be heightened by heightening the switching frequency $f_{SW}$ or the OCP trip point $V_{OCP}$.

Figure 8:
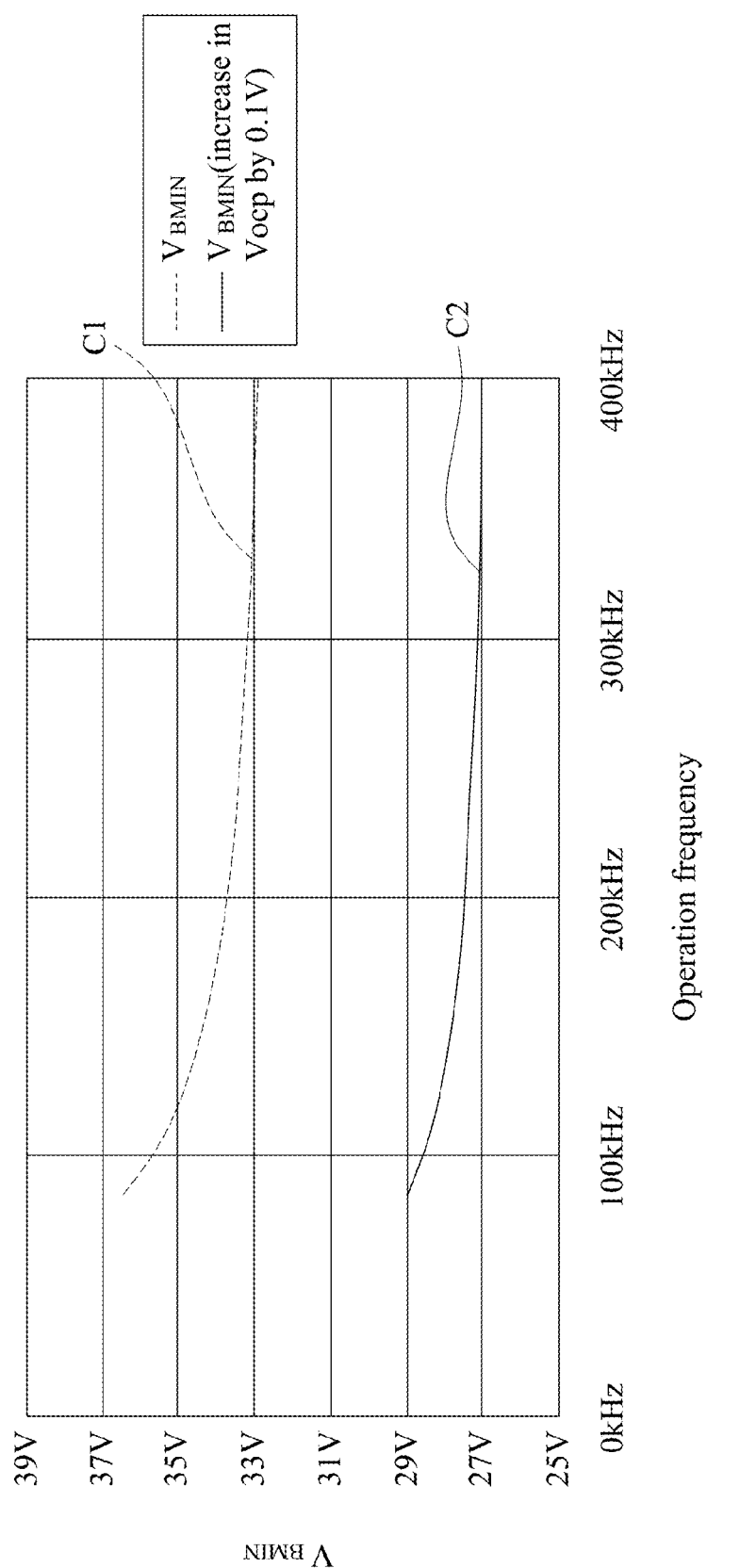
FIG. 8 gives a plot of the lowered minimum bulk capacitor voltage $V_{BMIN(low)}$ as a function of the increased switching frequency, parameterized with an increase in the OCP trip point.

FIG. 8 gives a plot of the lowered minimum bulk capacitor voltage $V_{BMIN(low)}$ as a function of the increased switching frequency $f_{SW(inc)}$, parameterized with an increase in the OCP trip point $V_{OCP}$, where the curve C1 corresponds to an original OCP trip point while the curve C2 corresponds to a heightened OCP trip point, i.e., increasing the original OCP trip point by 0.1V.

Figure 9:
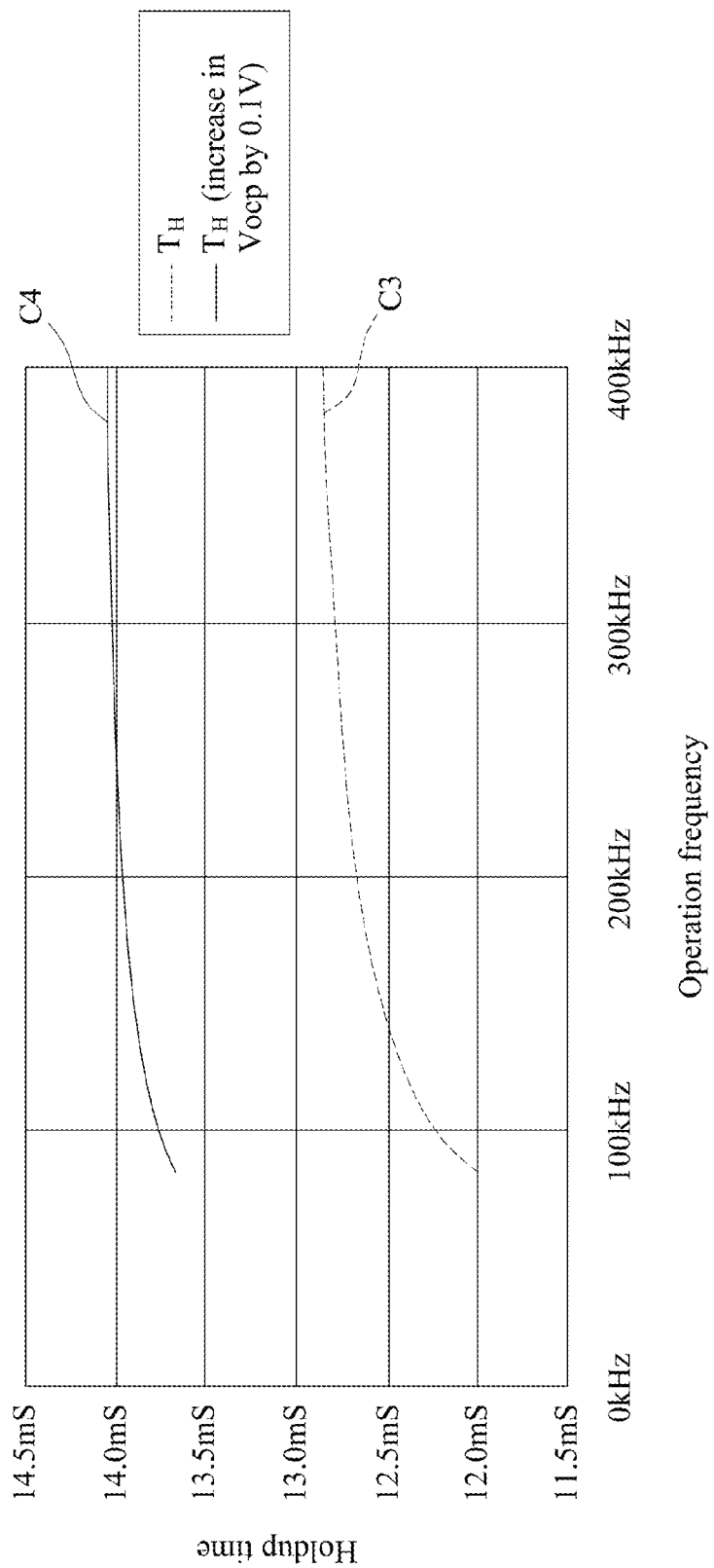
FIG. 9 gives a plot of the prolonged holdup time $T_{H(pro)}$ as a function of the increased switching frequency, parameterized with an increase in the OCP trip point.

FIG. 9 gives a plot of the prolonged holdup time $T_{H(pro)}$ as a function of the increased switching frequency $f_{SW(inc)}$, parameterized with an increase in the OCP trip point $V_{OCP}$, where the curve C3 corresponds to an original OCP trip point while the curve C4 corresponds to a heightened OCP trip point, i.e., increasing the original OCP trip point by 0.1V.

From FIG. 8 and FIG. 9 it can be concluded that the minimum bulk capacitor voltage $V_{BMIN}$ can be lowered and hence the holdup time $T_H$ can be prolonged by heightening the switching frequency $f_{SW}$ or the OCP trip point $V_{OCP}$. It goes without saying that a prolonged holdup time $T_H$ can be traded off for a downsized bulk capacitor $C_B$, i.e., trading better performance off for lower cost.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A method of dynamical control for a power supply converting an AC power source into a DC power source, comprising:
    an input capacitor or a bulk capacitor discharged down to its valley voltage when the sinusoidal AC voltage of the AC power source is lower than a bulk capacitor voltage of the bulk capacitor or when a bridge rectifier stops conducting current, and recharged up to its peak voltage when the sinusoidal AC voltage is higher than the bulk capacitor voltage or when the bridge rectifier starts conducting current;
    a PWM controller taking control of a primary power switch to regulate a secondary output voltage of the DC power source through a feedback control scheme; and
    the PWM controller increasing a switching frequency of the primary power switch during a holdup time to lower a minimum bulk capacitor voltage of the bulk capacitor to a maximum extent,
    wherein the holdup time is a time interval during which the power supply needs to hold up an output voltage of the regulated DC power source within a specified range after an outage of AC power.

2. The method as claimed in claim 1, wherein the primary power switch is implemented with a power MOSFET (Metal-Oxide-Semiconductor Field Effect Transistor) or a power BJT (Bipolar Junction Transistor).

3. The method as claimed in claim 1, wherein the input capacitor is implemented with an electrolytic capacitor or a polymer capacitor.

4. A method of dynamical control for a power supply converting an AC power source into a DC power source, comprising:

an input capacitor or a bulk capacitor discharged down to its valley voltage when the sinusoidal AC voltage of the AC power source is lower than a bulk capacitor voltage of the bulk capacitor or when a bridge rectifier stops conducting current, and recharged up to its peak voltage when the sinusoidal AC voltage is higher than the bulk capacitor voltage or when the bridge rectifier starts conducting current;

a PWM controller taking control of a primary power switch to regulate a secondary output voltage of the DC power source through a feedback control scheme; and the PWM controller increasing an OCP (Over-Current Protection) trip point during a holdup time to lower a minimum bulk capacitor voltage of a bulk capacitor to a maximum extent, wherein the holdup time is a time interval during which the power supply needs to hold up an output voltage of the regulated DC power source within a specified range after an outage of AC power.

5. The method as claimed in claim 4, wherein the primary power switch is implemented with a power MOSFET (Metal-Oxide-Semiconductor Field Effect Transistor) or a power BJT (Bipolar Junction Transistor).

6. The method as claimed in claim 4, wherein the input capacitor is implemented with an electrolytic capacitor or a polymer capacitor.

* * * * *